United States Patent [19]

Bernauer et al.

[11] 4,446,101
[45] May 1, 1984

[54] STORAGE MATERIAL FOR HYDROGEN

[75] Inventors: Otto Bernauer, Weinstadt; Klaus Ziegler, Ostfildern, both of Fed. Rep. of Germany

[73] Assignee: Daimler-Benz Aktiengesellschaft, Stuttgart, Fed. Rep. of Germany

[21] Appl. No.: 426,932

[22] Filed: Sep. 29, 1982

[30] Foreign Application Priority Data

Oct. 3, 1981 [DE] Fed. Rep. of Germany ....... 3139368

[51] Int. Cl.$^3$ ............................................ C22C 30/00
[52] U.S. Cl. ................................... 420/424; 420/580; 420/581; 420/583; 420/588; 420/900
[58] Field of Search ............... 423/644, 648; 420/900, 420/417, 420, 421, 424, 580, 581, 588

[56] References Cited

U.S. PATENT DOCUMENTS 4,111,689  9/1978  Liu ..................................... 423/644
4,278,466  7/1981  de Pous .............................. 423/644

FOREIGN PATENT DOCUMENTS 51-27890  3/1976  Japan ................................. 423/644

OTHER PUBLICATIONS

Newkirk, H. W., "A Literature Study of Metallic Ternary & Quarternary Hydrating", Sep. 19, 1975, Laurence Livermore Lab, Livermore, Ca., 31 pp.

Primary Examiner—L. Dewayne Rutledge
Assistant Examiner—Christopher W. Brody
Attorney, Agent, or Firm—Craig & Burns

[57] ABSTRACT

A storage material for hydrogen comprising an alloy with the following composition:

$Ti(V_{1-a-b}Fe_aAl_b)_xCr_yMn_{2-x-y}$, wherein:

$x$ = greater than 1, less than 2
$y$ = 0 to approximately 0.2
$x + y$ = not greater than 2
$a$ = 0 to approximately 0.25
$b$ = 0 to approximately 0.33
$a + b$ = not greater than approximately 0.35
$(1 - a - b) \cdot x$ = not less than 1

This storage material for hydrogen can, in the cold state, absorb a maximum of 3.2% by weight of $H_2$ and already possesses, at low temperatures, a high reaction speed for the absorption of hydrogen. During the absorption of hydrogen, the storage material exhibits self-heating to high temperatures. Thus, in addition to its use for storing hydrogen, it is also particularly suitable for use in preheating systems for hydride-type storage units of motor vehicles.

2 Claims, No Drawings

STORAGE MATERIAL FOR HYDROGEN

The present invention relates to a storage material for hydrogen, which is particularly suitable for use in preheating systems for hydride-type storage units of motor vehicles.

It is well known that heat is liberated during the process of charging hydride-type storage materials with hydrogen. This heat can be utilized for heating purposes. A heating process for hydride-type storage units of motor vehicles is known from German Offenlegungsschrift No. 29 21 451, which functions without any consumption of propulsion fuel. In this very economical process for the warm-up of motor vehicles priot to starting (preheating), the hydrogen released from a low-temperature hydride-type storage unit is absorbed in a high-temperature storage material accompanied by a release of heat. Because the high-temperature storage materials absorb hydrogen rapidly enough so as to produce heat with a predetermined reaction temperature, a proportion of low-temperature storage material is admixed to the high-temperature storage material according to German Offenlegungschrift No. 29 21 451. Already at low temperatures, this low-temperature storage material possesses a high absorption rate for the hydrogen, thereby heating up and raising the high-temperature storage material to the required reaction temperature.

The economic use of hydride-preheating systems of this type in conventional drive systems presupposes that the additional weight resulting from the installation of the preheating system does not amount to more than about 15 to about 25 kg. In order to attain the corresponding weights, hydrides having a very high energy density in terms of the enthalpy of the formation of the hydride are used. At the present time, the so-called "high-temperature hydrides," based on magnesium (e.g. $MgH_2$, $Mg_{0.95}Ni_{0.05}H_{1.9}$, $Mg_2NiH_4$), possess the highest energy densities (up to 2,600 kJ/kg). In order to achieve an adequate hydrogen absorption rate, these high-temperature hydrides must be raised to high temperatures, ranging from a minimum of 180° C. up to 200° C. These high temperatures are obtained by the admixed quantity of low-temperature hydride-type storage material (e.g. TiFe and TiCo, according to German Offenlegungsschrift No. 29 21 451).

Because, these low-temperature hydride-type storage materials possess a relatively low energy density, comparatively large quantities of these materials are needed to warm up the high-temperature hydride-type storage material. Because the low-temperature hydride-type storage materials produce considerably less heat during the process of charging them with hydrogen than the high-temperature hydride-type storage materials, the high-temperature storage unit becomes relatively heavy. Therefore, in order to minimize weight or to increase the capacity of the heating system with the same weight of the storage unit, there is a need to either increase the proportion of high-temperature hydride-type storage material in the high-temperature storage unit, or develop a hydride-type storage material, wherein the preheating operation can be dispensed with notwithstanding a high energy density.

Accordingly, it is the principal object of the present invention to provide new hydride-type storage materials, which have a high energy density as well as high reaction kinetics at temperatures down to below 0° C., and which, are capable of heating high-temperature hydride-type storage materials, such as Mg, $Mg_{0.95}Ni_{0.05}$, or $Mg_2Ni$, to their reaction temperature. Such new hydride-type storage materials would, therefore, be particularly suitable for use in preheating systems for hydride-type storage units.

The aforementioned problems are solved according to the present invention by a new storage material for hydrogen consisting of an alloy having the general formula $Ti(V_{1-a-b}Fe_aAl_b)_xCr_yMn_{2-x-y}$, wherein;

| |
|---|
| $x$ = greater than 1, but less than 2 |
| $y$ = 0 to about 0.2 |
| $x + y$ = not greater than 2 |
| $a$ = 0 to approximately 0.25 |
| $b$ = 0 to approximately 0.33 |
| $a + b$ = at most approximately 0.35 |
| $(1 - a - b) \cdot x$ = at least 1. |

The hydrogen storage material of the present invention comprises two foreign atoms per titanium atom, primarily vanadium and manganese atoms. However, no less than 1 vanadium atom is used per titanium atom. If an alloy containing less than 1 vanadium atom per titanium atom is used, the required heating temperatures of 180° to 220° C. are obtained only at hydrogen pressures in excess of 50 bar. A content of about 1.4 to about 1.6 vanadium atoms per titanium atom is preferred. The alloy may also contain chromium, in addition to the vanadium. However, the proportion of vanadium must be greater than the proportion of chromium or the effective storage capacity of the hydrides is lessened.

A portion of the vanadium atoms can be replaced by aluminum or iron. It is thus possible to replace up to about 25% of the vanadium atoms by iron atoms, and to replace up to about 33% of the vanadium atoms by aluminum atoms. If the vanadium atoms are replaced simultaneously by iron atoms and by aluminum atoms, then the total of vanadium atoms thus replaced should not exceed about 35%, and preferably should not exceed about 20% of the vanadium atoms. The replacement of about 10 to about 20% of the vanadium atoms by iron atoms or of about 3 to about 10% of the vanadium atoms by aluminum atoms is preferred.

Where pure vanadium is used, there is a reduced availability due to the high proportion of vanadium in the alloy and the material is more expensive. However, where a portion of the vanadium is replaced by iron or aluminum, thereby reducing the vanadium content, it is then possible to use the vanadium/iron $V_4Fe_1$ or $V_3Al_1$, which are available in large quantities and at advantageously low prices. The use of these master alloys results in a considerable reduction in the cost of the storage material. A material possessing the formula $TiV_{1.5}Fe_{0.4}Mn_{0.1}$ is particularly favorable with regard to both its cost of manufacture and its storage capacity.

In the cold state, the maximum $H_2$ capacity of the hydride-type storage materials according to the present invention amounts to as much as 3.2% by weight, referred to the mass of the hydride. Temperatures of between 400° C. and 450° C. are needed in order to drive off the hydrogen completely. The average enthalpy of the hydride formation is 35 kJ/mol of $H_2$ to 45 kJ/mol of $H_2$.

If the discharged hydride-type storage material is charged with $H_2$ at 0° C., then the hydride reaches temperatures in excess of 250° C. already at $H_2$-pressures below 5 bar. The hydride-type storage materials according to this invention are therefore not only suitable as such for storing hydrogen, but are also particularly suitable for use in the high-temperature storage unit of the preheating systems described hereinabove, where they can serve not only for the warm-up or preheating of high-temperature storage materials, such as Mg, Mg(Ni) or MgNi$_2$, but can even replace these materials with somewhat lesser demands of the heating capacity.

If the hydride material according to the present invention is employed as a hydrogen storage material in an H$_2$-vehicle, then H$_2$ storage-capacities, ranging from about 2.5% to about 3.2% by weight may be available for the driving operation, depending on the exhaust gas temperatures. Storage data thus become possible under driving conditions which could be achieved heretofore only with hydride storage units of the high/low combination type. With the hydride-type storage materials according to the present invention, the high storage capacities are also available already at relatively low engine loads since the enthalpy values for the formation of these hydrides are lower than the Mg, Mg(Ni) and Mg$_2$Ni hydrides.

The alloy in accordance with the present invention can be produced by the use of conventional techniques, forming no part of the present invention. The following is a typical example for the manufacture of alloys in accordance with the present invention and the results obtained with such alloys when used as hydrogen storage material are summarized in the following tabulation.

Various alloys were produced by melting together the elements, or master alloys, in an electric arc. The alloys were pulverized, and charged with hydrogen, at temperatures between 0° C. and 30° C. and under a pressure of up to 50 bar. The storage capacity (weight % of hydrogen, referred to the storage material), the quantity of heat obtainable per gram of storage material and the maximum temperature occurring in the storage material were determined. The results are summarized in the following Table.

TABLE

| Material | Starting Temperature [°C.] | Charging Pressure [bar] | Storage Unit Temperature T max [°C.] | Quantity of Heat Produced [Joule · g$^{-1}$] | Hydrogen Content [% by weight] |
|---|---|---|---|---|---|
| TiV$_{1.5}$Fe$_{0.4}$Mn$_{0.1}$ | 15 | 5.4 | 226 | 315 | 2.1 |
| TiV$_{1.5}$Fe$_{0.4}$Mn$_{0.1}$ | 15 | 6.8 | 240 | 351 | 2.2 |
| TiV$_{1.5}$Fe$_{0.4}$Mn$_{0.1}$ | 15 | 11.5 | 274 | 390 | 2.6 |
| For Comparison: | | | | | |
| TiV$_{0.8}$Fe$_{0.2}$Mn$_1$ | 15 | 10 | 138 | 338 | 1.9 |
| TiV$_{0.8}$Fe$_{0.2}$Mn$_1$ | 15 | 30 | 168 | 373 | 2.1 |
| TiV$_{0.8}$Fe$_{0.2}$Mn$_1$ | 15 | 50 | 185 | 387 | 2.18 |

As a typical example, the TiV$_{1.5}$Fe$_{0.4}$Mn$_{0.1}$ alloy was produced as follows: 47.3 g Ti, 76.41 g V, 22.34 g Fe and (5.49 g+5%) Mn were melted together in an electric arc furnace in the presence of argon and were remelted five times. The purity of the starting materials amounted to at least 99%. The addition of an excess of 5% of Mn took place to compensate the losses resulting from the evaporation of Mn during the melting process. An analysis of the final alloy produced the composition according to the aforementioned formula exactly.

Other typical examples of alloy compositions which were made according to the aforementioned process by melting together different quantities of corresponding pure starting materials and in which the following quantities of hydrogen can be stored, are:

| | |
|---|---|
| TiV$_{1.1}$Fe$_{0.25}$Al$_{0.05}$Mn$_{0.6}$ | H$_2$ content: 1.5 to 1.7% weight |
| TiV$_{0.8}$Fe$_{0.15}$Al$_{0.05}$Mn | H$_2$ content: 1.3 to 1.5% weight |
| TiV$_{1.2}$Fe$_{0.3}$Cr$_{0.1}$Mn$_{0.4}$ | H$_2$ content: 1.5 to 1.7% weight |

The specific composition of the alloy according to the present invention can be chosen at will by the manufacturer thereof to meet the most important specific requirements for its application. Thus depending on the particular requirements for the alloy, different compositions may be preferred from case to case.

While we have described the present invention by reference to specific examples, it is understood that it is not limited thereto, but is subject to of numerous changes and modifications as known to those skilled in the art, and we, therefore, do not wish to be limited thereto, but intend to cover all such changes and modifications as are encompassed by the scope of the appended claims.

We claim:

1. A storage material for hydrogen, comprising an alloy with the following composition:

Ti(V$_{1-a-b}$Fe$_a$Al$_b$)$_x$Cr$_y$Mn$_{2-x-y}$, wherein:

$x$ = greater than 1, but less than 2
$y$ = 0 to approximately 0.2
$x + y$ = not greater than 2
$a$ = 0 to approximately 0.25
$b$ = 0 to approximately 0.33
$a + b$ = not greater than approximately 0.35
$(1 - a - b) \cdot x$ = not less than 1.

2. The storage material for hydrogen according to claim 1, wherein the alloy has the composition TiV$_{1.5}$Fe$_{0.4}$Mn$_{0.1}$.

* * * * *